United States Patent

Greatwood et al.

[11] Patent Number: 6,101,553
[45] Date of Patent: Aug. 8, 2000

[54] COMMUNICATION NETWORK END STATION AND ADAPTOR CARD THEREFOR ELIMINATING ON-BOARD STORAGE OF OPERATING CONTROL CODE IN ADAPTOR CARD

[75] Inventors: Duncan MacDougall Greatwood, London; Nicholas Ian Moss, Harrow, both of United Kingdom

[73] Assignee: Madge Networks Limited, United Kingdom

[21] Appl. No.: 08/783,706

[22] Filed: Jan. 15, 1997

[30] Foreign Application Priority Data

Feb. 8, 1996 [GB] United Kingdom ............... 9602552

[51] Int. Cl.⁷ ................................................. G06F 13/00
[52] U.S. Cl. .................................... 709/250; 709/230
[58] Field of Search ................ 395/200.8, 200.6, 395/200.62, 285; 709/250, 230, 232

[56] References Cited

U.S. PATENT DOCUMENTS

| | | | |
|---|---|---|---|
| 5,027,290 | 6/1991 | Kirk et al. | 345/509 |
| 5,251,302 | 10/1993 | Weigl et al. | 710/263 |
| 5,446,915 | 8/1995 | Pierce | 395/800.11 |
| 5,596,575 | 1/1997 | Yang et al. | 370/486 |
| 5,659,777 | 8/1997 | Iwasaki et al. | 395/200.56 |
| 5,768,622 | 6/1998 | Lory et al. | 710/35 |

FOREIGN PATENT DOCUMENTS 0 577 115 A2  1/1994  European Pat. Off. .
0 657 824 A1  6/1995  European Pat. Off. .

OTHER PUBLICATIONS

Manuel, T., "Here's One Net No Computer Can Outrun," ELECTRONICS, Vol. 61, No. 16, Oct. 1988, New York, U.S., p. 139.

European Search Report dated Jun. 2, 1997.

Primary Examiner—Zarni Maung
Attorney, Agent, or Firm—Sughrue, Mion, Zinn, Macpeak & Seas, PLLC

[57] ABSTRACT

A communication network end station is constituted by a host device including a processor and a memory; a bus; and a communication network interface device connected to the host device via the bus and, in use, to a communication network along which data is transmitted in accordance with a network protocol. The communication network interface device includes a processor which transfers data to and from the network in accordance with the network protocol. The control code for operating the processor is stored in the host device memory. The processor is adapted to route incoming data and associated network protocol information, as it is received, to the host device memory. The bus is capable of transmitting data and associated network protocol information at a speed compatible with the operating speed of the communication network.

9 Claims, 1 Drawing Sheet

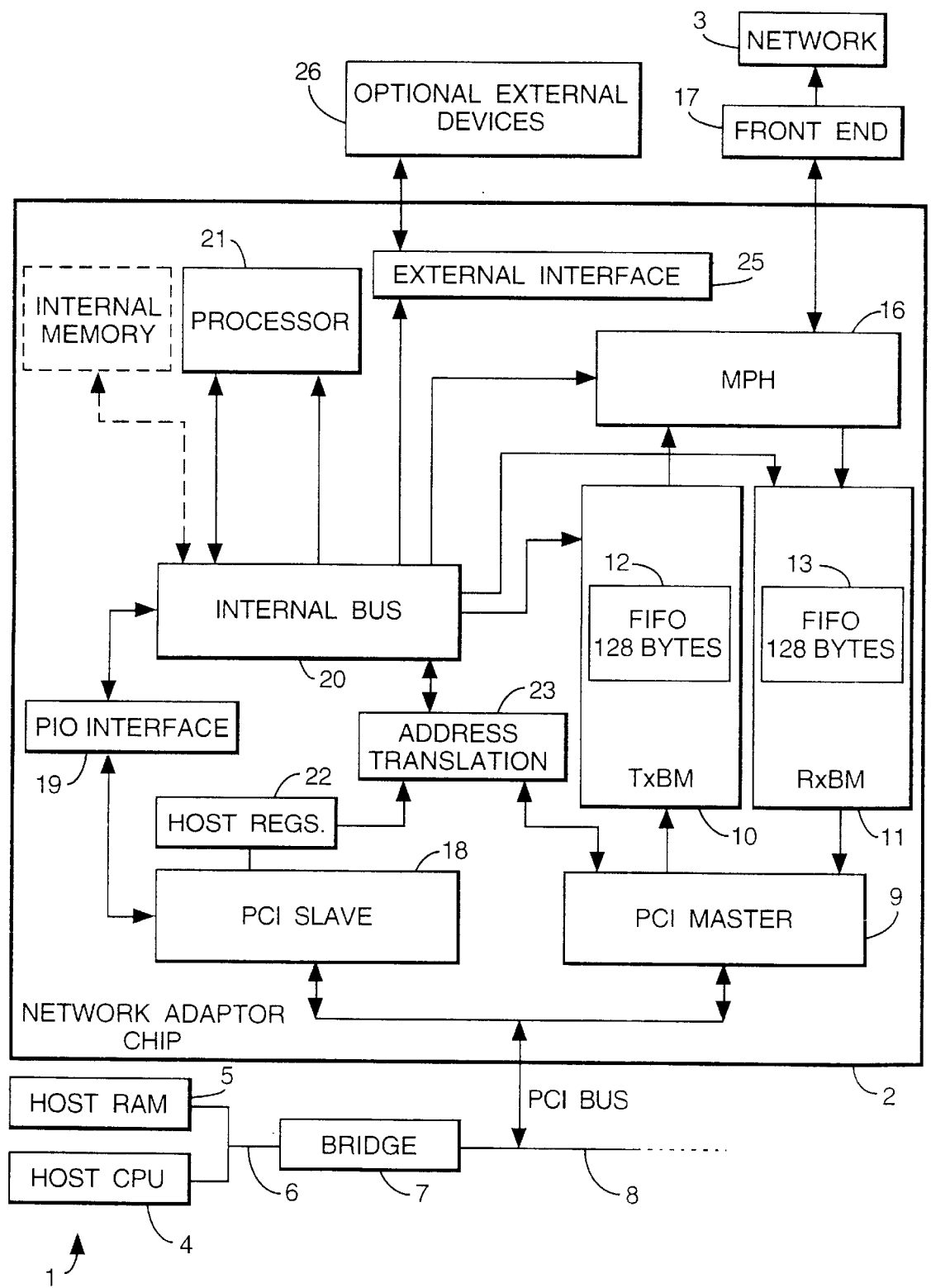

COMMUNICATION NETWORK END STATION AND ADAPTOR CARD THEREFOR ELIMINATING ON-BOARD STORAGE OF OPERATING CONTROL CODE IN ADAPTOR CARD

FIELD OF THE INVENTION

The invention relates to a communication network end station for use with a communication network and also to an adaptor card for insertion into such a communication network end station.

DESCRIPTION OF THE PRIOR ART

Typically, network adaptor cards contain a RAM buffer store to facilitate data transfer from the network to the host system and vice versa. This RAM is used as temporary local storage for data destined for transmission to the network or just received from the network. The adaptor card processor has high speed access to this storage with a guaranteed minimum rate of transfer which is essential for proper operation of the network.

Transfer between the RAM buffer store and the host system may be implemented in a variety of ways, the most common being: i) shared memory, where all or part of the RAM buffer store is accessible to both the adaptor and the host, ii) programmed input/output where the adaptor card processor transfers data using I/O cycles to a fixed location, which then map to an auto-incrementing location in the buffer store, iii) DMA transfers, where a DMA engine, either on the adaptor card or in the host, transfers data from the adaptor card store to the host memory and vice versa without intervention from the adaptor card processor.

Typical token ring network adaptor cards contain an on-board processor to manage network status and control signalling (MAC frames in token ring), and to schedule the flow of data to and from the network. The processor runs instructions stored in on-board ROM, or downloaded into on-board RAM when the system starts up.

There is a continuing need to reduce the cost of adaptor cards.

SUMMARY OF THE INVENTION

In accordance with one aspect of the present invention, a communication network end station comprises a host device including a processor and a memory; a bus; and a communication network interface device connected to the host device via the bus and, in use, to a communication network along which data is transmitted in accordance with a network protocol, the communication network interface device including processing means for transferring data to and from the network in accordance with the network protocol and is characterised in that the control code for operating the processing means is stored in the host device memory; in that the processing means is adapted to route incoming data and associated network protocol information, as it is received, to the host device memory; and in that the bus is capable of transmitting data and associated network protocol information at a speed compatible with the operating speed of the communication network.

In accordance with a second aspect of the present invention, an adaptor card for use with a communication network end station comprising a host device including a processor and a memory, and a bus to which the adaptor card is connected in use, wherein the bus is capable of transmitting data and associated network protocol information at a speed compatible with the operating speed of the communication network the adaptor card includes a communication network interface device having processing means for transferring data to and from the network in accordance with the network protocol and is characterised in that the control code for operating the processing means is stored in the host device memory in use; and in that the processing means is adapted to route incoming data and associated network protocol information, as it is received, to the host device memory.

We have designed a new interface device, preferably in the form of an adaptor card, in which the need for on-board RAM storage is overcome. This is achieved by storing not only incoming data in the host memory but also associated network protocol information (for example token ring MAC frames) and the control code for operating the processing means. This latter feature means that even on-board ROM is avoided although a very small amount of ROM or RAM may be provided for holding code corresponding to the idle state of the processing means, (i.e. the state where frames are passed from the host to the network and from the network to the host without modification by the processor; the code required to generate and process MAC frames being stored in host memory).

Preferably, the bus comprises one of a PCI, EISA, and Microchannel bus. These provide high data transfer rates.

In use, part of the memory map for the processing means is mapped into addresses in the host memory, those addresses being secured against reuse by the host operating system.

Typically, the interface device further includes a direct memory access (DMA) device for transferring information to and from the host device memory via the bus. The use of a DMA device reduces the complexity of the operations performed by the processing means and leads to very fast transfers of data between the host device and interface device.

In some cases, the interface device may further include a pair of FIFOs, one of which receives information from the communication network prior to transfer to the host memory device and the other of which receives information for transmission onto the communication network from the host memory device. The use of FIFOs absorbs the effect of small delays in transfer to and from the host device.

BRIEF DESCRIPTION OF THE DRAWING

An example of a communication network end station according to the present invention will now be described with reference to FIG. 1 which is a schematic block diagram of the end station.

DESCRIPTION OF THE EMBODIMENT

The end station comprises a host device 1 connected to an adaptor card 2 which provides an interface between the host device 1 and a communication network 3, such as a token ring. The host device 1 includes a host CPU 4 and host RAM 5 linked by a high speed proprietary bus 6. The bus 6 is linked by an interface bridge 7 to a PCI bus 8 which is linked to the adaptor card 2.

The adaptor card 2 includes a PCI master unit 9 providing a DMA engine, the unit 9 being connected to respective transmit and receive buffer managers 10,11. Each buffer manager 10,11 contains a respective FIFO 12,13. The buffer managers 10,11 are connected to a protocol handler 16 described in more detail in our U.S. patent application Ser.

No. 08/703,532, now abandoned, incorporated herein by reference. The protocol handler 16 is connected to front end circuitry 17 of conventional form which provides a link to the network 3.

The PCI bus 8 is also connected to a PCI slave unit 18 which is linked via a PIO interface 19 to an internal bus 20. An on-board processor 21 is connected to the internal bus 20, as is a memory address translation unit 23. The PCI slave 18 is also connected a set of registers 22. An external interface 25 is connected to the internal bus 20 and is used to connect to optional external devices 26. The transmit buffer manager 10 and the receive buffer manager 11 can be controlled via the internal bus 20.

The PIO 19 interface allows the host processor to access devices attached to the internal bus without the intervention of the on-board processor.

An overview of the operation of the end station shown in FIG. 1 will now be described. Firstly, it will be noted that there is virtually no memory provided on the adaptor card 2. The code for running the processor 21 is stored in the host RAM 5 while frames being received and transmitted are also stored in the RAM 5 including protocol control frames such as MAC frames. MAC frames may be stored in different locations corresponding to high and low priority frames respectively. The buses 6,8 can be operated sufficiently fast to enable the code and frames to be transferred between the host and the adaptor card without compromising operation of the network.

Data Received from the Network

When data is received on the network 3, it is passed to the front end circuit 17 where it is demodulated and passed to the protocol handler 16. The protocol handler 16 passes frames destined for its own unique adaptor address to the receive buffer manager 11.

In addition, the buffer manager 11 notifies the processor 21, via the internal shared bus 20, the type of received frame, i.e. MAC or data (LLC). Copying of the frame will stop if address match fail is signalled or there is insufficient space to store the frame in host memory.

The receive buffer manager 11 in conjunction with the DMA engine in the PCI master unit 9 writes the frame from the FIFO 13 into the host RAM 5.

The buffer manager 11 ensures that the received frame is correctly reported to the rest of the network as having been copied if, and only if, there was sufficient space available in the host RAM buffers to store the entire packet.

If the FIFO 13 overflows because access to bus 8 is not granted, by the interface 7, the copied bit in the incoming frame will not be set.

Data to be Transmitted onto Network

When the host CPU 4 signals to the transmit buffer manager 10 that there is a data packet ready for transmission, the buffer manager begins reading data from the host RAM 5 using the DMA engine within the master unit 9. This data is transferred into the FIFO 12 and when a predetermined amount of data has been placed there, the buffer manager 10 instructs the protocol handler 16 to acquire a free token from the network 3. When the token has been obtained, data is removed from the FIFO 12 and serialised onto the network by the protocol handler 16. As the FIFO empties, the transmit buffer manager 10 ensures that there is always sufficient data available for transmission to continue until the end of the frame. The buffer manager 10 automatically reads linked buffers and data fragments from the host memory 5 until it encounters a flag indicating the end of the frame.

Processing of MAC Frames

The function of the processor 21 is to process and generate network management packets and to initiate transmission of data stored in the host memory. The processor 21 gains access to the host memory 5 through the address translation unit 23, which is controlled by a bank of base registers within the host register block 22. These are initialised by the host processor 4 when the network driver software is started. The driver must allocate one or more continuous blocks of host physical memory and lock them so that they are removed from any memory management scheme running on the host. The driver can then set the base registers in the network adaptor card 2 to point to this physical memory area. Within the adaptor card 2, each base register maps up to 64 K bytes of the processor memory space.

MAC (network management) packets are automatically written into a receive buffer area in the host memory 5 by the receive buffer manager 11.

In some cases, the receive buffer manager 11 will distinguish between different types of MAC frame and high priority MAC frames will be stored in a different location from low priority frames.

We claim:

1. A communication network end station comprising a host device including a processor and a memory; a bus; and a communication network interface device connected to said host device via the bus and, in use, to a communication network along which data is transmitted in accordance with a network protocol, the communication network interface device including processing means for transferring data to and from the network in accordance with the network protocol, wherein the control code for operating said processing means is stored in said host device memory, said processing means is adapted to route incoming data and associated network protocol information, as it is received, to said host device memory, and the bus is capable of transmitting data and associated network protocol information at a speed compatible with the operating speed of the communication network.

2. An end station according to claim 1, wherein said bus comprises one of a PCI, Eisa, and Microchannel bus.

3. An end station according to claim 1, wherein said interface device further includes a direct memory access (DMA) device for transferring information to and from said host device memory via said bus.

4. An end station according to claim 1, wherein said interface device further includes a pair of FIFOs, one of which receives information from said communication network prior to transfer to said host memory device and the other of which receives information for transmission onto said communication network from said host memory device.

5. An end station according to claim 1, wherein said communication network protocol is a Token Ring protocol.

6. A communication network connected to at least one end station comprising a host device including a processor and a memory; a bus; and a communication network interface device connected to said host device via the bus and to said communication network, the communication network interface device including processing means for transferring data to and from the network in accordance with the network protocol, wherein the control code for operating said processing means is stored in said host device memory, said processing means is adapted to route incoming data and associated network protocol information, as it is received, to said host device memory, and the bus is capable of transmitting data and associated network protocol information at a speed compatible with the operating speed of the communication network.

7. An adaptor card for use with a communication network end station comprising a host device including a processor and a memory, and a bus to which the adaptor card is connected in use, wherein the bus is capable of transmitting data and associated network protocol information at a speed compatible with the operating speed of the communication network, the adaptor card including a communication network interface device having processing means for transferring data to and from the network in accordance with the network protocol, wherein the control code for operating said processing means is stored in the host device memory; and said processing means is adapted to route incoming data and associated network protocol information, as it is received, to said host device memory.

8. An adaptor card according to claim 7, further including a direct memory access (DMA) device for transferring information to and from said host device memory via said bus.

9. An adaptor card according to claim 8, further including a pair of FIFOs, one of which receives information from said communication network prior to transfer to the host memory device and the other of which receives information for transmission onto said communication network from said host memory device.

* * * * *